Feb. 21, 1933.       W. L. FICKEY       1,898,356
APPARATUS FOR TRANSPORTING AND DELIVERING POWDERED MATERIAL
Filed Feb. 3, 1932
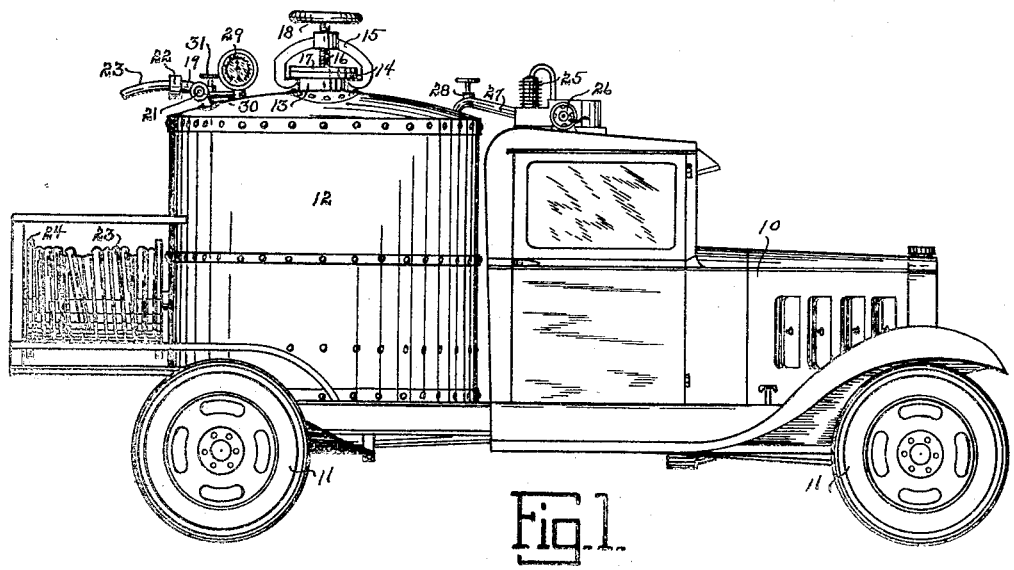
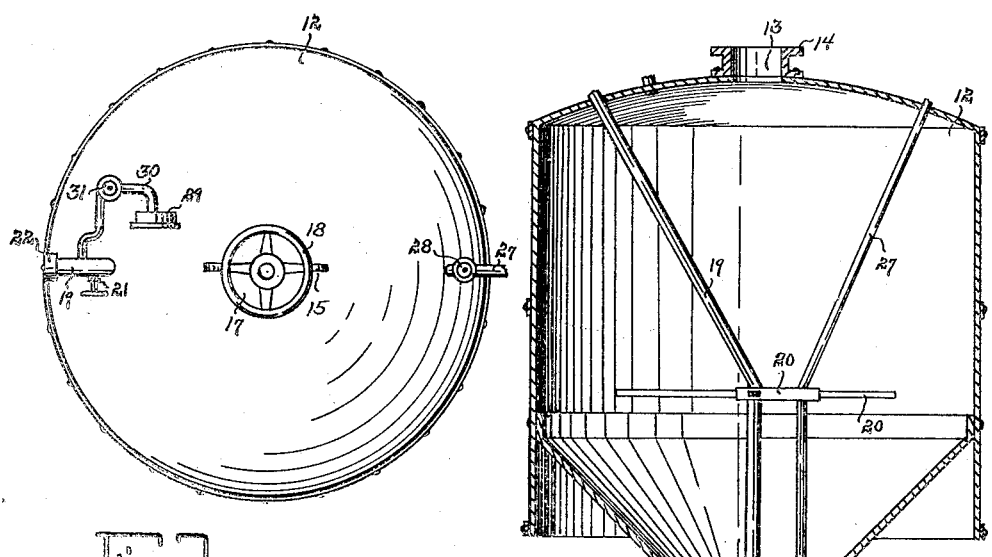
INVENTOR.
W. L. FICKEY
BY
M. Talbert Dick
ATTORNEY.

Patented Feb. 21, 1933

1,898,356

UNITED STATES PATENT OFFICE

WARD L. FICKEY, OF SIOUX CITY, IOWA

APPARATUS FOR TRANSPORTING AND DELIVERING POWDERED MATERIAL

Application filed February 3, 1932. Serial No. 590,649.

The principal object of this invention is to solve the difficult problem of transporting and delivering powdered material such as comminuted coal from a central plant or reduction plant to outlaying points where the powdered material is to be used.

A further object of my invention is to provide an apparatus for the delivery of powdered material to a receiving bin that eliminates the possibility of the packing and clogging of the material in the delivery apparatus, thereby making successful delivery with dispatch and efficiency.

A still further object of this invention is to provide an apparatus for the transportation and delivery of comminuted material without loss of the material during transit or during the delivery of the same at the receiving end.

A still further object of my invention is to provide an apparatus for transporting and delivering powdered material such as comminuted coal that is capable of successfully delivering the powdered material to places not readily accessible.

A still further object of this invention is to provide an apparatus for transporting and delivering comminuted coal that is exceptionally clean in operation.

A still further object of my invention is to provide an apparatus for transporting and delivering powdered coal that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my complete apparatus ready for use.

Fig. 2 is a top plan view of the powdered material holding tank of the invention.

Fig. 3 is a side sectional view of the powdered material holding tank and more fully illustrates its interior construction.

One of the present methods of furnishing powdered fuel and the like to points of use is to place the fuel in sacks at the plant or central location, haul the filled sacks to the purchaser or user, and then empty the sacks in the hopper or bin of the purchaser or user. This procedure has many disadvantages, principally due to the fuel itself as its fineness and lightness makes it very susceptible to mixing with the atmosphere which invariably takes place when the sack is opened and the contents shaken out into the bin. This means not only a waste of material but the soiling of property in the vicinity. Furthermore, the sacks must be of almost air tight construction such as paper sacks. When a sack becomes torn which often happens, much valuable material is lost.

Also the sacks are an economic loss. This method of transportation and delivery of powdered material is very dirty and tiresome to the workmen and much valuable and costly time is experienced. It was to overcome such objections that I designed my apparatus for transporting and delivering powdered material.

I have used the numeral 10 to generally designate an automotive vehicle having the usual wheels 11. Mounted on this vehicle is my powdered material holding tank 12 having its bottom tapering downwardly as shown in Fig. 3. The numeral 13 designates a neck on top of the tank communicating with the inside of the same and having a peripheral flange 14 at its rim. I have used the numeral 15 to designate a bracket having its two hooked ends capable of engaging the underside of the flange 14 and extending over the top of the neck 13. Threaded through the central portion of this bracket is a rod 16 having swivelled on its lower end the lid 17 capable of closing the top of the neck 13. The numeral 18 designates a hand wheel rigidly secured to the top of the threaded rod 16 to facilitate its manual rotation. By this construction when the wheel is rotated to the left the bracket 15 carrying the rod 16 and the lid 17 will be removed from the neck 13. To replace this portion of the device on the neck 13 it is merely necessary to place the two hooked ends of the bracket under the flange 14 and rotate the hand wheel 18 to the right which will force the lid 17 tightly on top of the neck 13 and rigidly secure the bracket 15 to the neck 13. The lid 17 and neck 13 should be of such fit one to the other that when the lid is tightened downwardly on the neck it will tightly seal the tank 12. It is through this neck 13 that the powdered material is inserted in bulk condition.

The numeral 19 designates the powdered material outlet pipe extending into the tank 12 and terminating near its bottom as shown in Fig. 3. The lower end portion of this pipe is held in proper position near the dead center bottom of the tank by the spider 20 which has its outer ends secured to the tank 12 by any suitable means.

Interimposed in the pipe 19 at a point outside of the tank 12 is a manually operated valve 21 shown in conventional form. Formed on the upper and outer end of the pipe 19 is the usual screw hose connection 22 designed to receive in the usual manner one end of a flexible hose 23 which when not in use may be rolled on a reel 24 mounted on the vehicle as shown in Fig. 1. The numeral 25 designates a small air compressor operated by an electric motor 26, both of which are shown in conventional form and mounted on the vehicle 10. The electric motor 26 may receive its source of electrical energy from the storage battery or generator of the motor of the vehicle or, if desired, the air compressor 25 may be run by the internal combustion motor of the vehicle itself.

The numeral 27 designates an air pressure pipe extending into the top of the tank 12 and terminating near the bottom of the tank 12, as shown in Fig. 3. The upper end of this pipe 27 communicates with the air compressor 25 as shown in Fig. 1. The numeral 28 designates a manually operated valve shown in conventional form and interimposed in the pipe 27 at a point outside of the tank 12. The spider 20 inside the tank 12 besides supporting the pipe 19 also supports the pipe 27. The numeral 29 designates an ordinary air pressure gauge shown in conventional form and communicating with the inside top of the tank 12.

The numeral 30 designates a small pipe on the outside of the tank 12, having one end communicating with the inside of the tank communicating pipe of the pressure gauge 29 and its other end communicating with the inside of the pipe 19, at a point beyond the valve 21 as shown in Fig. 2.

The practical operation of the invention is as follows: The powdered material to be transported and delivered is placed in the tank 12 through the neck 13. Any desired amount of this material may be deposited in the tank 12, but the tank 12 should not be completely filled with the powdered material as an air space is desired to exist in the top of the tank 12 and above the powdered fuel placed therein. After the powdered material has been placed in the tank 12, the neck should be tightly closed by the lid 17, as hereinbefore explained. The hand valve 21 should be in a closed position and the hand valve 28 in an open condition. The compressor 25 should then be actuated which will inject air under pressure through the pipe 27. As the pipe 27 terminates near the inside bottom of the tank 12, the air injected into the tank 12 will filter upwardly from the bottom of the tank 12 and through the powdered material deposited in the tank. This action will loosen the powdered material inside the tank 12, thereby eliminating undesirable caking and packing and promoting the free flowing of the powdered material out of the pipe 19 when the vehicle has reached its delivery destination. This feature is very necessary and important due to the inherent peculiarities of powdered fuel. If the pipe 27 terminated just inside the top of the tank 12, the air under pressure injected into the tank 12 would not only not eliminate packing and caking, but would promote it. For these reasons which make for the successful transportation and delivery of powdered material, I have caused the pipe 27 to terminate near the dead center bottom of the tank 12.

The air compressor 25 is allowed to operate until sufficient pressure is built up inside the tank 12 to successfully expel the powdered material through the pipe 19. As the pressure gauge 29 communicates with the inside of the tank 12, the existing pressure inside the tank 12 may be easily and quickly ascertained. After suitable pressure exists in the tank 12, the compressor 25 should be stopped and the hand operated valve 28 closed. Although I have designated the use of a small compressor on the vehicle 10 for injecting air under pressure into the tank 12, any desirable method of causing pressure to exist inside the tank 12 may be employed. In other words it may be desirable to inject air pressure into the tank 12 from a suitable source at the central plant. After the vehicle 10 has transported the powdered material to the location or locations of use, the hose 23 is unwound on the reel 24 and one of its ends screwed into the connection 22. The opposite end of the hose 23 will naturally be the discharge end and it should be inserted into the hopper or bin to receive the powdered material. By the use of a flexible hose, out-of-the-way places such as basements and the like, become readily accessible, due to the fact that the flexible hose may be passed through a window or like and make any number of turns or curves before it reaches its destination. By opening the valve 21, the air pressure above the powdered fuel will cause it to pass up, through the pipe 19 and into and through the hose 23 to the receiving hopper or bin. This result is possible due to the extreme fineness of powdered material such as comminuted fuel and when such air pressure is placed back of it it will flow almost like liquid. Although comminuted coal is extremely light and fine it is practically impervious, thereby making it possible for the action of the air pressure to be exerted on the top of the coal.

With the powdered material being impervious practically no air filters through the powdered material and passes through the hose 23, thereby making it possible to deliver the powdered fuel without delivering an excess amount of air with it.

Although powdered material can be made to flow it is still packable, which is not true of liquids. In attempting to force comminuted fuel out of a funnel or like, it has a tendency to pack and not freely flow. By having the pipe 19 extend into the tank 12, from the top of the tank 12 and terminating in close proximity to the bottom of the tank, serious packing of the powdered material at time of delivery is eliminated. The reason for this is that all of the material going upwardly through the pipe 19 does not experience any progressive restrictions such as found in a funnel, but on the other hand removes just that much material from the bottom of the tank 12. This removal of the material from the bottom of the tank 12 relieves any packing or caking at this point which is the outlet point of the powdered material. The tapered bottom of the tank 12 makes it possible to expel practically all of the powdered material from the tank before any air under pressure passes out of the tank 12 to the pipe 19.

With such an apparatus it is possible and practical to deliver small quantities of powdered fuel to various delivery points. After each delivery it of course is very desirable to eliminate the existence of quantities of powdered fuel in the hose 23. To accomplish this the valve 21 is closed and a manually operated valve 31, which is interimposed in the pipe 30, is opened. This allows the air under pressure in the top of the tank 12 to pass through the pipe 30 and into the pipe 19 beyond the hand valve 21.

This air under pressure will then pass through the hose 23, thereby cleaning it of all powdered fuel deposits. As soon as the hose is cleaned, the valve 31 should be closed to conserve the air pressure inside the tank 12.

If the pressure inside the tank becomes too low to properly force the powdered fuel through the pipe 19 and hose 23, it is merely necessary to start the compressor 25. The hand valve 21 may be used not only to stop all flow of material through the pipe 19, but may be used to control and regulate the flow of the powdered material passing from the tank 12.

Although I have described my apparatus as particularly adapted to the transporting and delivering of powdered fuel, it may be used to equal advantage in the transporting and delivering of other types and kinds of flowable materials or liquids. In the case of finely comminuted material, the device provides a very efficient, clean and unwasteful transportation and delivery means.

Some changes may be made in the construction and arrangement of my improved apparatus for transporting and delivering powdered material, without departing from the real spirit and purpose of my invention, and it is my intention to cover by my claims any modified forms of structure or use of mechanical equivalents which may be reasonably included within their scope.

I claim:

1. In an apparatus for transporting and delivering powdered material substantially impervious to air, a tank, a wheeled vehicle for supporting said tank, a discharge pipe extending into said tank and terminating near the bottom thereof, a manually operated valve interimposed in said pipe and positioned outside of said tank, a second pipe extending into said tank and terminating near the bottom of said tank, a means for injecting air into and through said last mentioned pipe, a valve for closing said last mentioned pipe at times, a flexible conduit secured at one of its ends to the outer end of said discharge pipe, a third pipe having one end operatively communicating with the inside top of said tank and its other end communicating with the inside of said discharge pipe at a point beyond the said manually operated valve in said pipe, and a manually operated valve interimposed in said third pipe.

2. In an apparatus for transporting and delivering powdered material substantially impervious to air, a tank, a wheeled vehicle for supporting said tank, a discharge pipe extending into said tank and terminating near the bottom thereof, a manually operated valve interimposed in said pipe and positioned outside of said tank, a second pipe extending into said tank and terminating near the bottom of said tank, a means for injecting air into and through said last mentioned pipe, a valve for closing said last mentioned pipe at times, a flexible conduit secured at one of its ends to the outer end of said discharge pipe, a pressure gauge communicating with the inside top of said tank, a third pipe having one end communicating with said pressure gauge and its other end communicating with the inside of said discharge pipe at a point beyond the said valve interimposed therein, and a manually operated valve interimposed in said third pipe.

3. In a device for transporting powdered material substantially impervious to air, a tank, a discharge pipe extending into said tank and terminating near the bottom of the same, a manually operated valve interimposed in said pipe and positioned outside of said tank, an air inlet pipe terminating inside said tank, a means for injecting air into and through said air inlet pipe, a third pipe having one end operatively communicating with the inside top of said tank and its other end communicating with the inside of said discharge pipe at a point beyond the said manually operated valve in said pipe, and a manually operated valve interimposed in said third pipe.

WARD L. FICKEY.